United States Patent Office 2,883,760
Patented Apr. 28, 1959

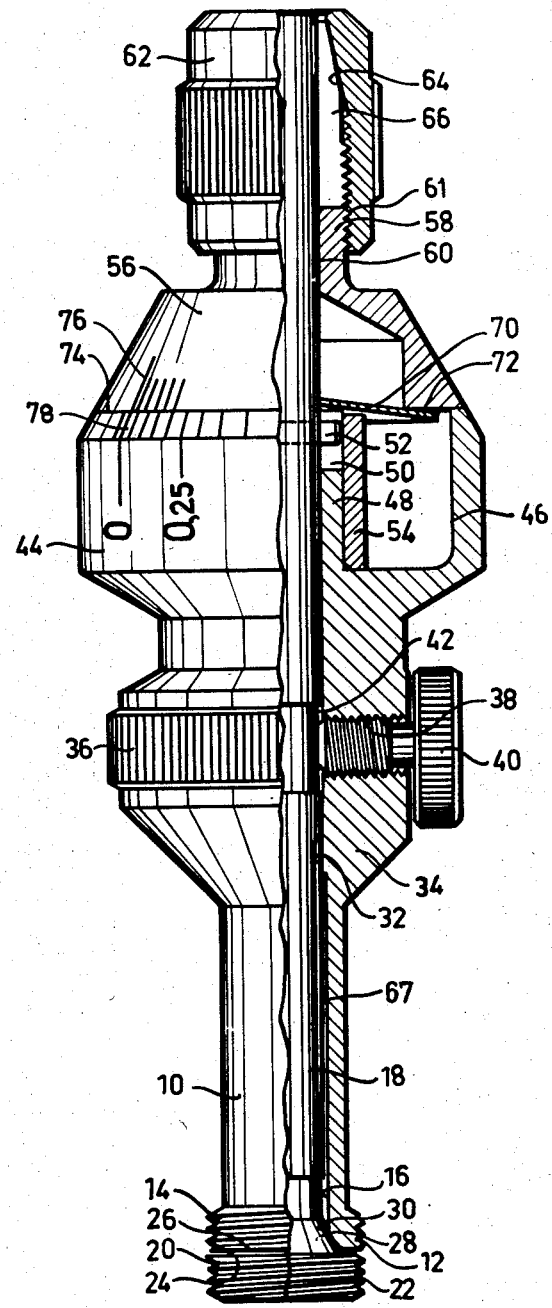

2,883,760

DEVICE FOR MEASURING AND CHECKING SCREW THREADS

Alf Anders Anselm Eriksson, Nacka, Sweden, assignor to Aktiebolaget Svenska Precisionsverktyg, Nacka, Sweden, a corporation of Sweden Application June 12, 1957, Serial No. 665,202

Claims priority, application Sweden June 14, 1956

5 Claims. (Cl. 33—199)

This invention relates to a device for measuring and checking screw threads.

More particularly this invention relates to a device for measuring and checking screw threads of the kind comprising two bodies mutually rotatable and in axial juxtaposition and disposed respectively at one end of a tubular element and at the adjacent end of a spindle rotatably received in said tubular element, each body being provided with a screw thread, the screw thread of one body when in a predetermined initial position constituting a continuation of the screw thread of the other body.

One main object of the invention is to provide a device of the above kind which is simple to manufacture and which facilitates compensation for wear arising during use of the device or of constituent parts thereof so as to ensure accurate mutual alignment of the screw threaded bodies.

A further object of the invention is to provide a construction wherein the elements carrying the bodies are held together with sufficient friction to cause one element to be carried along with the other without any additional locking when the threaded body of the latter element is moved into or out of engagement with the screw thread to be measured without the friction hindering correct measuring movements.

Further objects and advantages of the invention will become apparent from the following description considered in connection with the accompanying drawing which forms part of this specification and which shows partly in elevation and partly in an axial section a device constructed according to this invention.

Referring to the drawing, a tubular element 10 carries at one end a body 12 formed as an outwardly extending flange and provided with an external screw thread 14. The tubular element 10 has an axially extending bore 16 in which a spindle 18 is rotatably received. The spindle 18 carries at one end a body 20 located outside the tube 10 and provided with an external screw thread 22 having exactly the same dimensions and pitch as the thread 14. The bodies 12 and 20 have plane annular surfaces 24, 26 spaced from and facing one another and extending transversely to the spindle. In a predetermined initial position of the body 20 relative to the body 12, the screw threads 14 and 22 form a continuation of one another, with a break in the region between the surfaces 24, 26. The spacing between these surfaces is determined by a tapered portion 28 on the spindle 18 co-operating with a correspondingly tapered portion 30 in the end of the bore 16 of the tube element 10, said portion 30 forming a bearing seat for the tapered portion 28 of the spindle. The spindle 18 extends with a predetermined clearance 67 through the tube 10 and is provided with a further bearing constituted by the wall of a cylindrical bore 32 in an enlarged portion 34 of the tubular element 10. The axial extent of said clearance 67 is several times longer than the diameter of the spindle 18, and this contributes to the feature that the accurate centring between the bodies 12 and 20 is not disturbed by any non-uniform wear of the sliding surfaces of the seat 30 and the tapered end portion 28 of the spindle.

The enlarged portion 34 of the tubular element 10 is primarily intended to serve as a handle for operation of the device and for this reason is provided with an external knurled surface 36. Said portion 34 has a radially extending bore 38 provided with internal screw threads to receive a locking screw 40. The inner end of the screw 40 enters an annular groove 42 formed in the spindle. Furthermore, the tubular element 10 is provided with another enlarged portion 44 preferably presenting a cylindrical external surface, said portion having an internal annular recess 46 bounded at its radially inner edge by a tubular neck 48 bored for the spindle 18. Said neck is provided at its end edge with two diametrically opposed notches 50 having a predetermined axial dimension to receive the ends of a pin 52 which passes through the spindle 18, thereby limiting the rotational movement of the spindle 18 relatively to the tubular element 10. A tubular socket 54 is pressed onto the neck 48 and prevents radial displacement of the pin 52.

A hood-like portion 56 provided with a shank portion 58 receives the extension of the spindle 18 in an internal bore 60, and is disposed on the spindle 18 in axially abutting relation to the enlarged portion 44. The hood portion 56 is detachably connected to the spindle by a chuck member comprising a sleeve 62 in threaded engagement with the shank portion at 61 and provided with an internal tapered portion 64. The internal tapered portion 64 co-operates with and actuates wedge shaped resilient jaws 66 formed at the end of the shank portion 58.

A spring member is interposed between the hood-shaped portion 56 and the tubular element 10, said spring member in the embodiment illustrated comprising a plane washer 70 made of thin spring steel and acting between a shoulder 72 of the hood-shaped portion 56 and the end edge of the neck 48. The contact pressure of the tapered portion 28 at the end of the spindle 18 against the seat surface 30 therefore depends on the force exerted by said spring washer 70.

The hood-shaped portion 56 and the enlarged portion 44 of the tubular element abut in a plane 74 which is transverse to the spindle 18, and they are provided adjacent their abutting edges with a vernier scale 76 and a main scale 78, respectively, by means of which the mutual rotary position of the tube element 10 and the spindle 18 from a predetermined initial position can be read and set, respectively.

When the device described above is to be used, for instance, for measuring a thread, the scales 76, 78 are set to the initial position, that is, the zero position, whereupon the bodies 12, 20 are screwed into the thread which is to be measured. Then the spindle 18 is turned by means of the chuck member 62 relatively to the tubular element 10 until the threads of the bodies engage the flanks of the thread to be measured, and the deviation is read on the scales. After reading, the spindle 18 is turned by means of the chuck member 62 relatively to the tubular element back to the zero position. The device is not screwed out of the measured thread until after readjustment to said zero position. Inasmuch as the unscrewing is performed by way of the chuck member 62 connected to the spindle 18, the friction between this unit and the tubular member 10 must be at least so large as to bring along the tubular member, since otherwise a self-locking effect is created between the threaded portions 22 and 14. In the construction illustrated the friction is obtained by means of the conical seating surfaces 28 and 30 in combination with the axially resilient member 70. If this predetermined friction is not provided, either a separate locking operation would have to be performed by means of the locking screw 40 or else the unscrewing would have to be made by means of the knurl 36 of the tubular member. These latter procedures are not desirable because they require considerably more time than the first-mentioned method of unscrewing.

It will be understood from the foregoing that in the use of the device during a fairly long period of time some wear of its parts cannot be avoided for which reason the reading of the scales by that time will show a gradually increasing error. Due to the design of the measuring device according to the invention, however, it is possible to restore the correct relationship between the scales by loosening the chuck member 62 in such a manner as to permit the hood-shaped portion 56 to be turned relative to the spindle until the scales coincide properly, whereupon the chuck is tightened again. Furthermore, the risk of incorrect centring occurring between the threads of the bodies 12, 20 is eliminated by the conical bearing 28, 30. An accurate centring is particularly important when the device is used as a preset gauge.

While one more or less specific embodiment of the invention has been shown and described, it is to be understood that this is for purpose of illustration only and that the invention is not to be limited thereby, but its scope is to be determined by the appended claims.

What I claim is:

1. A device for measuring and checking screw threads of the kind comprising a tubular element, and a spindle rotatably mounted therein, two mutually rotatable bodies, one of said bodies being mounted on one end of said spindle and the other of said bodies being mounted on the adjacent end of said tubular member in axial juxtaposition to the first named body, each body being provided with a screw thread, the screw thread of one body when in a predetermined initial position constituting a continuation of the screw thread of the other body, said tubular element having a coniform seat in its bore at said one end, said spindle being formed at that end with a coniform portion, and a spring interposed between said tubular member and said spindle and constantly urging said coniform portion against said coniform seat.

2. A device according to claim 1, wherein the bodies each have a plane surface facing and spaced from one another and extending transversely to the spindle.

3. A device according to claim 1, wherein the tubular member has a bearing which is axially spaced from said coniform seat and in which said spindle is journaled, and wherein said spindle has clearance relative to said tubular member between said bearing and said seat, and wherein the axial spacing between said bearing and said seat is several times larger than the maximum diameter of the portion of the spindle between said bearing and said seat.

4. A device according to claim 1 and having the tubular element and the spindle provided with a main scale and a vernier scale, respectively, for reading rotation of one body relatively to the other from said predetermined initial position, wherein a member is mounted on the spindle which is angularly adjustable relatively to the spindle and to which said vernier is applied, and wherein means is provided for securing said member fixedly to said spindle after adjustment.

5. A device according to claim 1, wherein means are provided for locking the tubular element and the spindle together.

References Cited in the file of this patent

UNITED STATES PATENTS

| | | |
|---|---|---|
| 1,829,797 | Hartness | Nov. 3, 1931 |
| 2,805,487 | Steczynski | Sept. 10, 1957 |